United States Patent [19]

Swersey et al.

[11] 4,023,633

[45] May 17, 1977

[54] FLEXURE SCALE

[76] Inventors: Burt L. Swersey, 152 Edgemont Road, Scarsdale, N.Y. 10583; Peter I. Fried, 61 Old Knollwood Road, White Plains, N.Y. 10607

[22] Filed: Dec. 22, 1975

[21] Appl. No.: 642,793

[52] U.S. Cl. .............................. 177/144; 177/257; 177/DIG. 3

[51] Int. Cl.[2] ................. G01G 19/52; G01G 21/08

[58] Field of Search ............. 177/170, 1, 210, 230, 177/257, DIG. 1, DIG. 3, DIG. 9, 144

[56] References Cited

UNITED STATES PATENTS

| | | | |
|---|---|---|---|
| 2,954,969 | 10/1960 | McCullough et al. | 177/211 X |
| 3,044,563 | 7/1962 | Gumpertz et al. | 177/3 |
| 3,123,166 | 3/1964 | Schellentrager | 177/DIG. 9 |
| 3,338,324 | 8/1967 | Burke et al. | 177/257 |
| 3,373,830 | 3/1968 | Thomson | 177/210 X |
| 3,459,271 | 8/1969 | Susor et al. | 177/25 X |
| 3,477,533 | 11/1969 | Hyer et al. | 177/230 X |
| 3,658,143 | 4/1972 | Schwartz | 177/257 X |
| 3,705,636 | 12/1972 | Dunphy et al. | 177/210 X |
| 3,724,574 | 4/1973 | Hutchinson et al. | 177/210 |
| 3,831,687 | 8/1974 | Maffia et al. | 177/257 X |
| 3,863,724 | 2/1975 | Dalia, Jr. | 177/1 X |

*Primary Examiner*—George H. Miller, Jr.
*Attorney, Agent, or Firm*—Kenyon & Kenyon Reilly Carr & Chapin

[57] ABSTRACT

A flexure scale is made of compact, inexpensive construction and includes a load frame which is supported via flexures from a stationary support frame. The load frame includes two oppositely directed beam arms which are displaced when a load is placed on the load frame. The two beam arms are connected together to permit a summation of their displacements and the longer beam arm is secured at the free end to the support frame by means of a spring which proportionally restrains the displacement of the beam arm. A linear variable differential transformer is mounted on the support frame to emit signals corresponding to the displacements of the beam arms to a digital readout means. The electrical output of this transformer is adjusted to produce a fixed output for a standard load.

A system composed of a multiplicity of these scales requires only a single read-out means.

20 Claims, 10 Drawing Figures

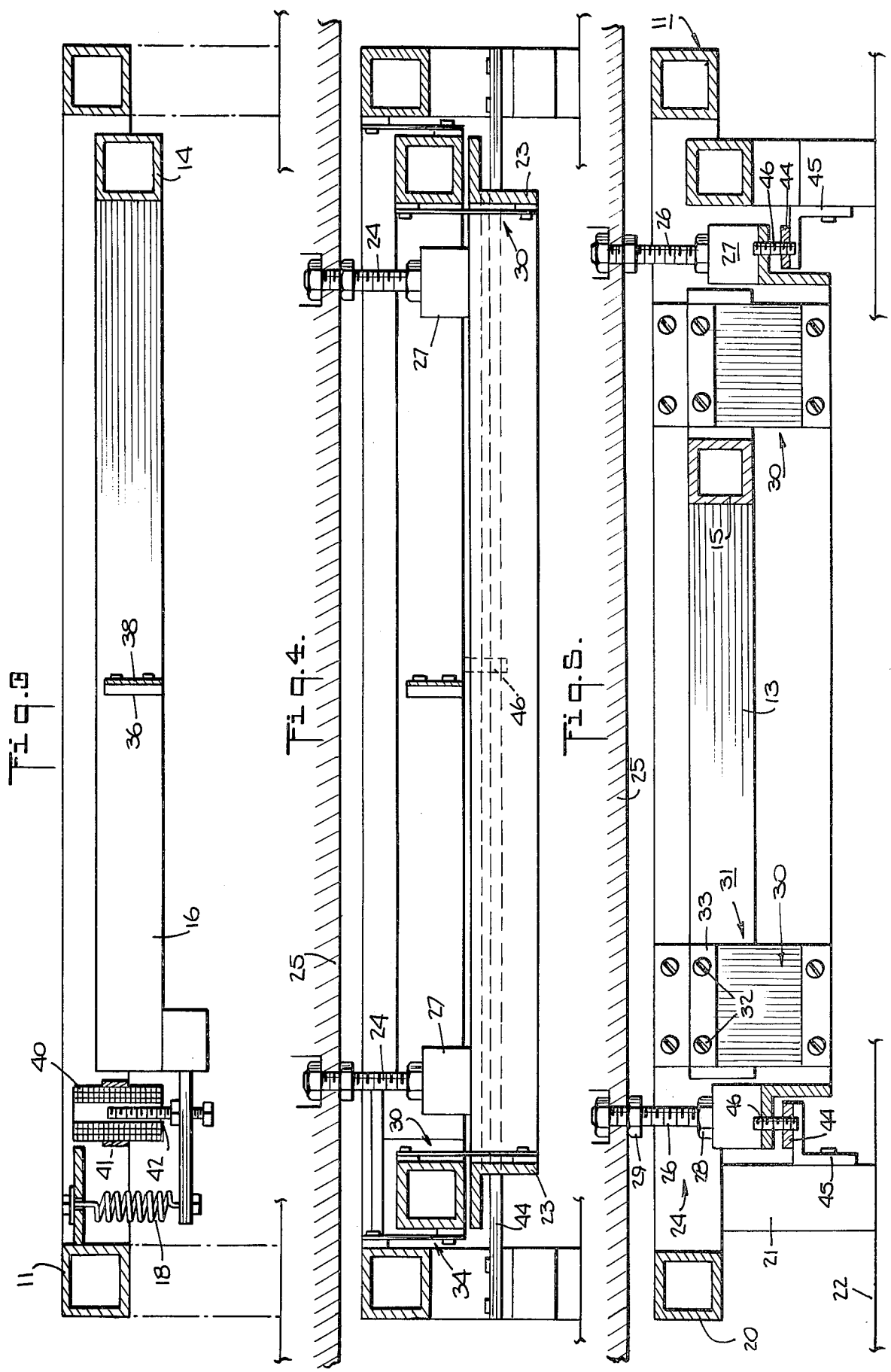

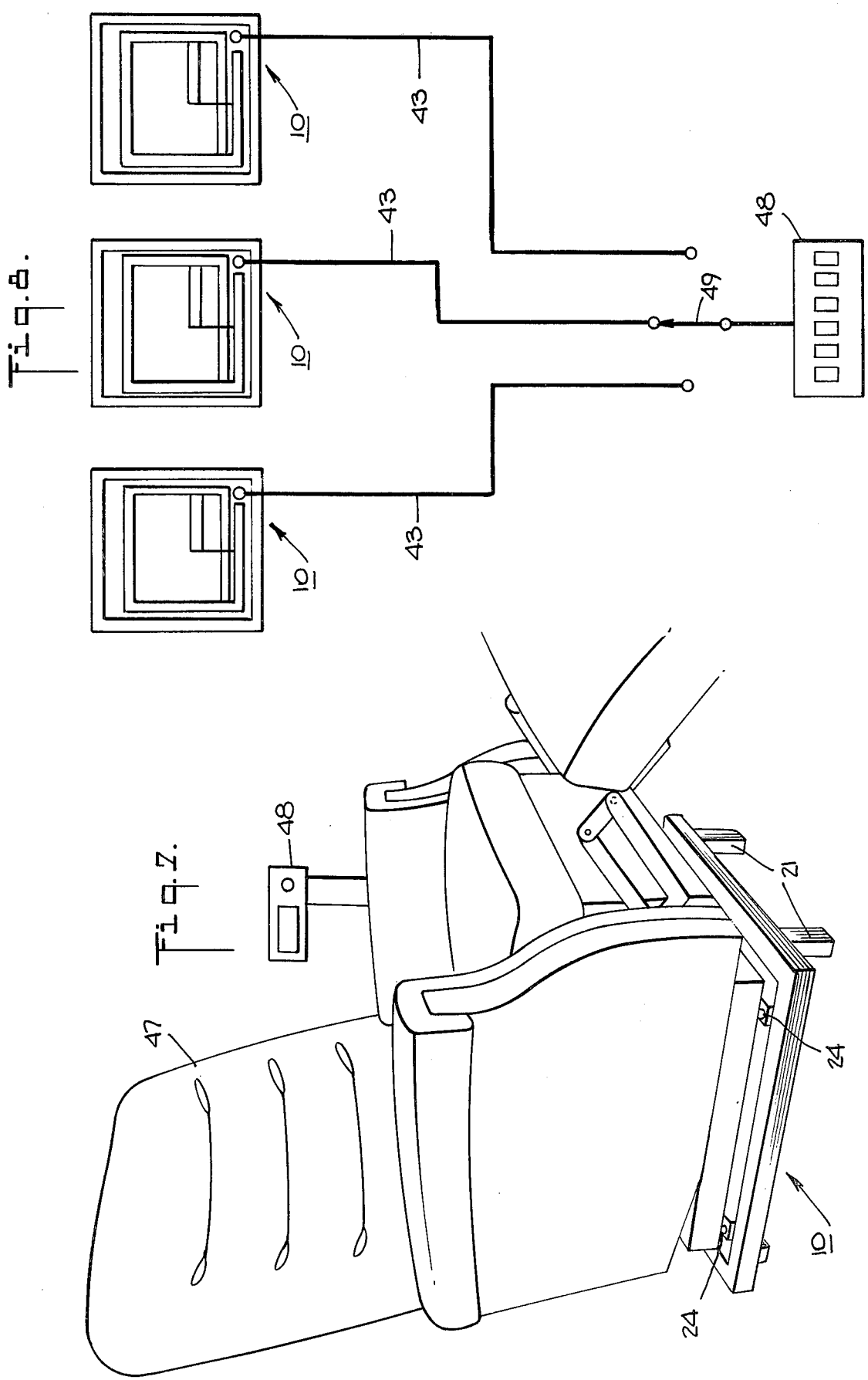

FLEXURE SCALE

This invention relates to a flexure scale. More particularly, this invention relates to a system of scales which utilize a single read-out means to indicate weights or changes in weights on the individual scales.

As is known, various types of scales have been used for weighing purposes. In some of the more conventional types, a load is placed on a load platform and the mass of the load transferred via various mechanical, hydraulic and/or electrical means to a readout or dial device which displays a measure of the weight of the load. In many cases, use has been made of knife edges and levers in order to transmit the load from the load platform to the readout devices. However, because such scales incur wear, the scales become inaccurate over periods of time. In order to overcome such deficiencies, various types of flexure scales have been proposed. Generally, these scales have utilized flexible resilient metallic bands as suspending, connecting and fulcra elements for sustaining the entire load. Such scales are described in U.S. Pat. Nos. 1,790,509 and 2,736,539. Other types of flexure scales have utilized load cells which are mounted symmetrically within the scale frame in order to receive a load from a load platform and to transmit a signal in response thereto, for example as described in U.S. Pat. No. 3,658,143. Still other types of flexure scales are also known which employ strain gauge transducers such as described in U.S. Pat. Nos. 3,512,595 and 3,666,032 to weigh loads.

However, the various types of known flexure scales have been relatively expensive. For example, in comparison with ordinary platform scales, the cost of electronic readout flexure scales is about twice as much. In addition, the use of strain gauges adds to the cost of such scales since the strain gauges themselves are relatively expensive and require rather complex and expensive electronic circuitry to give a readout of weight.

In addition, the various flexure scales which have been available are generally of heavy construction and, in some cases, cumbersome to move about or to use.

As is also known, scales are generally provided with built-in read-out or dial devices to display an indication of weight of a load. Usually, such scales are employed on a continuous basis to continuously monitor the weight of a variable load or to weigh successively applied loads. In other cases, these scales have been used "on-demand", that is, as in a supermarket to periodically weigh produce, meat and the like. However, in many cases, a read-out of a weight on a scale may only be required at periodic intervals such as during a dialysis treatment. In such cases, where a multiplicity of scales may be in use, the provision of a read-out on each scale is excessive and leads to an expensive system.

Accordingly, it is an object of this invention to provide a lightweight flexure scale utilizing a minimum number of parts.

It is another object of the invention to provide an inexpensive flexure scale.

It is another object of the invention to provide a digital scale which is accurate and reliable over extended periods of time.

It is another object of the invention to provide a multiplicity of scales with a single read-out means.

It is another object of the invention to provide a relatively inexpensive readout scale which can be utilized in large numbers in a medical environment with but a single readout means to monitor with the weight of patients.

Briefly, the invention provides a scale comprising a support frame, a load frame disposed within the support frame for receiving a load, a pair of displacement transmitting members disposed on opposite sides of the support frame and a plurality of flexures which connects the load frame to each of the displacement transmitting members and each of the displacement transmitting members, in turn, to the support frame. The interconnection of the flexures, the members and frames is such as to permit each displacement transmitting member to pivot under the applied weight of a load on the load frame. In addition, a beam arm is secured to each of the displacement members to pivot with the member with one arm being shorter than the other arm. A transfer arm is secured to and between the beam arms in order to transfer the load of the shorter beam arm to the longer beam arm. In this way, the loads on the two weighing arms are summed together in the longer of the two beam arms.

In addition, a means, such as a spring, is disposed between the longer beam arm and the support frame to proportionally restrain movement of the beam arm relative to the support frame.

Also, a sensing means, such as a linear variable differential transformer, is mounted on the support frame for emitting a signal corresponding to the displacement of the longer beam arm relative to the support frame as a measure of the magnitude of a load on the load frame. For example, the transformer includes a coil on the support frame and a core on the beam arm. The sensing means may also be of an optical or capacitive type.

The scale further includes a readout means which receives the signal of the sensing means and displays a value corresponding to the signals as a measure of the magnitude of the load on the load frame. This readout means may be of a digital type or the analog type.

The arrangement of the parts of the scale is such that the beam arm which is restrained by the spring and which cooperates with the linear variable differential transformer is located to one side of the scale. Thus, the scale may be used to weigh objects which pass through an opening defined by the load frame. Also, the components of the scale can be arranged so that the support frame is within the load frame.

In addition, the load frame is provided with suitable means for securing a load platform or the like thereto. In this way, a flat platform can be secured to the scale to receive various types of objects to be weighed. The securing means may also be used to secure a chair, such as a lounge chair to the scale for use in monitoring the weight of medical patients, such as patients undergoing dialysis treatment.

The scale further includes a means for restraining lateral horizontal motion of the load frame relative to the support frame to prevent excessive movement of the load frame.

In accordance with the invention, the scale may be constructed so as to be periodically connected to a readout means. In this way, a multiplicity of such scales can be used with a single read-out means. For example, a single read-out means can be transported from one scale to another and plugged in to obtain a read-out. Alternatively, a remote read-out means may be electronically connected to the scales to be switched from one to another to obtain a read-out. This overall system permits a reduced cost, particularly for dialysis treatment, since only one readout means is required. In such a case, each scale would incorporate a means for adjusting the tare load on the load frame and, where a linear variable differential transformer is used as the sensing means, would have a means within the transformer for adjusting the gain.

The scale may also be used to display the total weight of an object or patient or can be zeroed out with an object or patient thereon to show fluctuations in weight. These fluctuations can also be read with a sensitivity ten times the sensitivity of the total weight reading. For example, if the total weight is read to 0.1 kilograms (kg), fluctuations in weight can be read to 0.01 kilograms (kg) by moving a switch on the readout means to cause the gain of the electronics to be multiplied ten times. The scale is thus particularly useful in dialysis treatment since the weight loss of a patient undergoing treatment can be read directly rather than indirectly by taking readings of pressures, temperatures and the like.

The use of the spring to limit the movement of the beam allows the maximum applied load to be kept within the working range of the linear variable differential transformer, for example a range of ±0.10 inches. Without the spring, the beam and the core of the transformer would move through a much larger distance for an applied load. Further, the flexures have a certain spring rate and without the spring, the flexures would have to be very stiff to limit the motion of the core and therefore would be insensitive to small weights. By using a spring to provide most of the resistance to the beam arm movement, the flexures can be made very flexible and sensitive to small loads. For example, the spring may have a spring constant of a magnitude of 50 pounds per inch while the flexures have an effective spring constant of a magnitude of 1 pound per inch.

These and other objects and advantages of the invention will become more apparent from the following detailed description and appended claims taken in conjunction with the accompanying drawings in which:

FIG. 3 illustrates a view taken on line 3—3 of FIG. 1;

FIG. 4 illustrates a view taken on line 4—4 of FIG. 1;

FIG. 5 illustrates a view taken on line 5—5 of FIG. 1;

FIG. 7 illustrates a perspective view of the flexure scale of FIG. 1 in combination with a lounge chair;

FIG. 8 illustrates a schematic view of a plurality of flexure scales with a single read out means;

Figure 1:
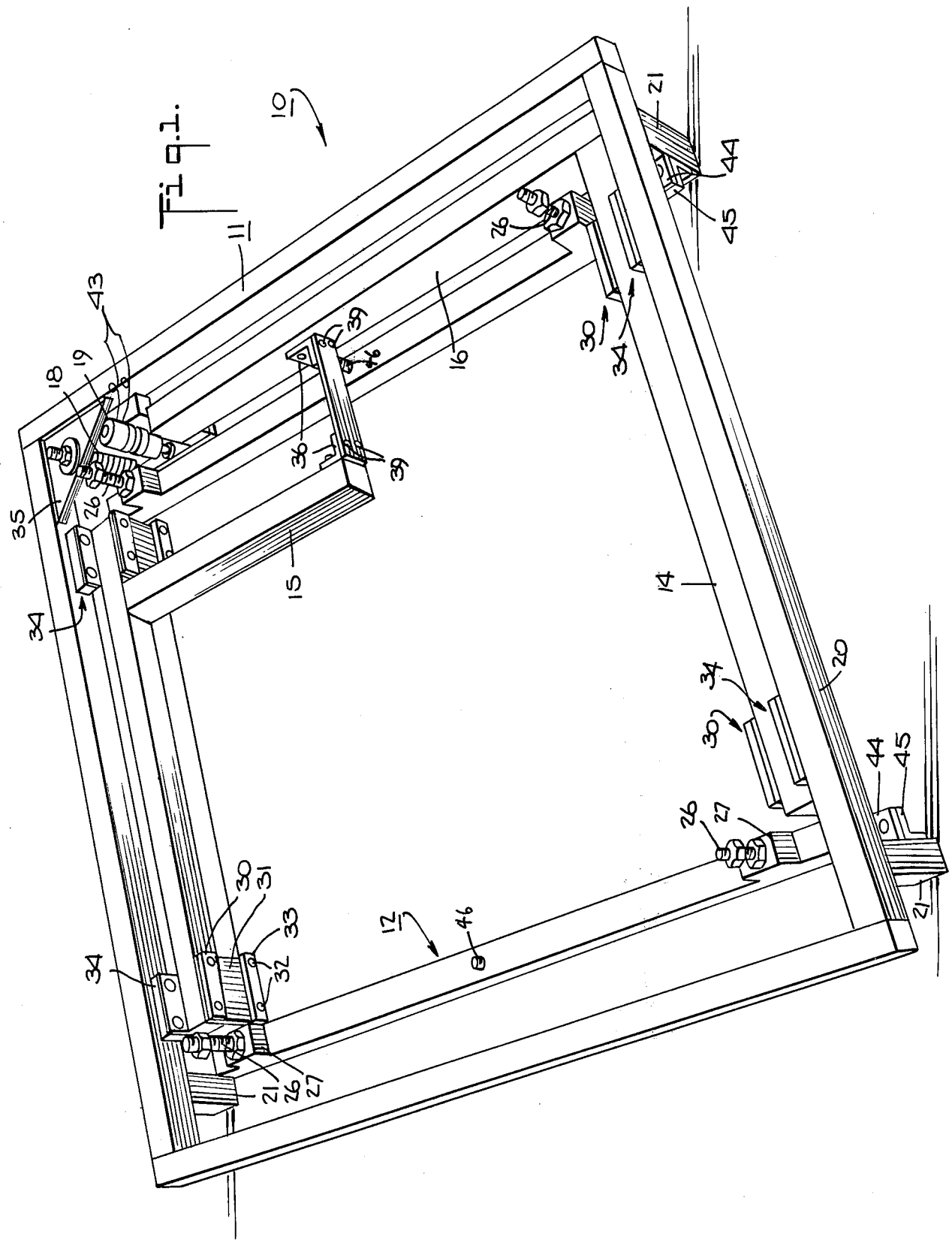
FIG. 1 illustrates a perspective view of a flexure scale according to the invention.

Referring to FIG. 1, the flexure scale 10 includes a support frame 11, a load frame 12 and a pair of displacement transmitting members 13, 14. In addition, each of the members 13, 14 carries a beam arm 15, 16 with one beam arm 15 being connected by a transfer arm 17 to the other arm 16. A means, such as a spring 18 is connected to the beam arm 16 near the free end and to the support frame 11 for proportionally restraining the movement of the beam arm 16 relative to the support frame 11. In addition, a sensing means, such as a linear variable differential transformer 19 (hereinafter LVDT), is mounted on the support frame 11 near one corner for emitting signals corresponding to the displacements, i.e. deflections of the beam arm 16 relative to the support frame 11.

Figure 6:
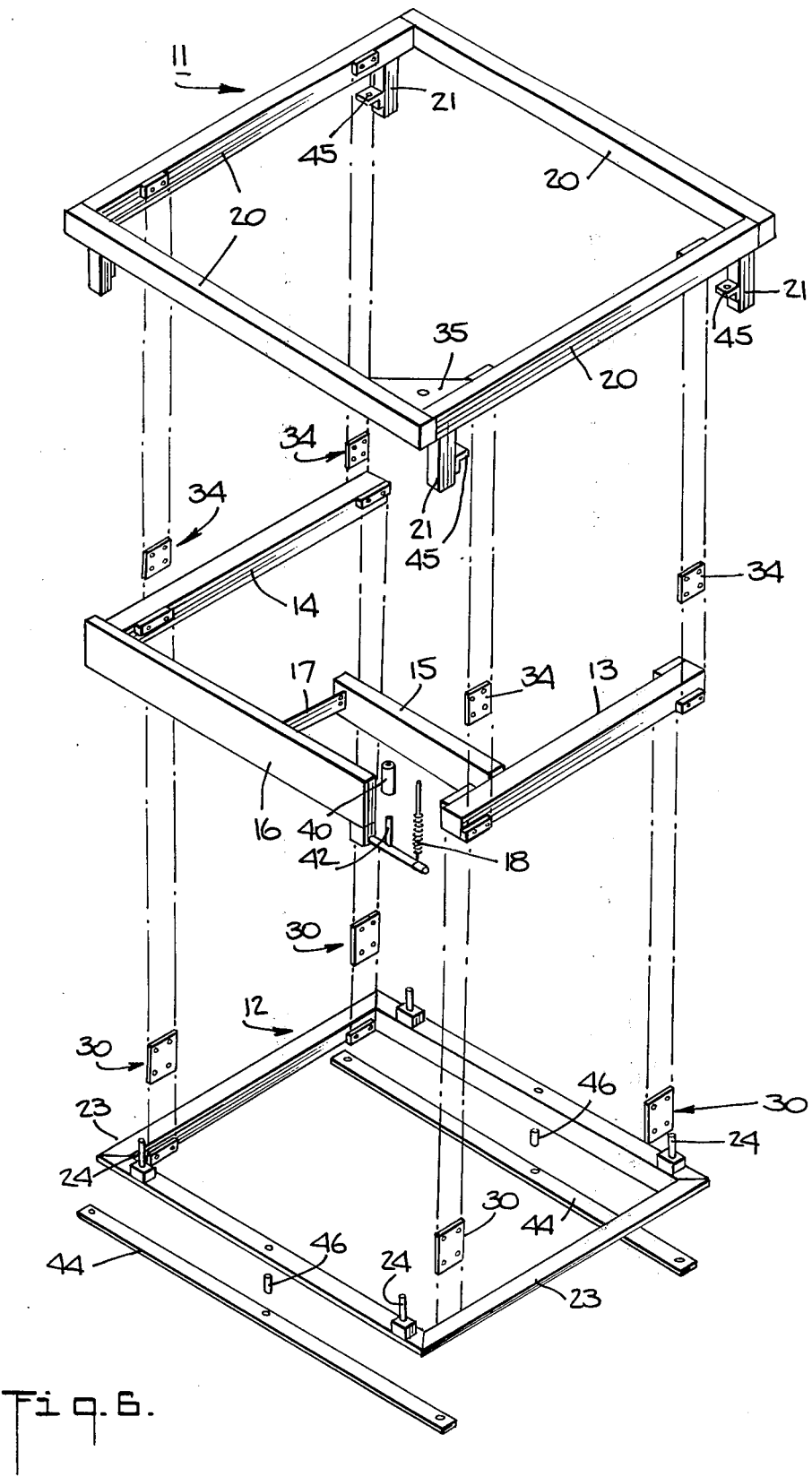
FIG. 6 illustrates an exploded schematic view of the flexure scale of FIG. 1.

Referring to FIGS. 1, 5 and 6, the support frame 11 is of rectangular configuration and is made up of a plurality of tubular members 20 which are interconnected to each other as by welding to define a rectangular opening. In addition, a plurality of support legs 21 are secured to the tubular members 20 at the corners of the frame 11 in order to support the frame 11 over a floor 22 or other suitable surface. Each leg 21 may be mounted on a roller or a level adjusting foot.

Referring to FIGS. 1, 4, 5 and 6, the load frame 12 is also of rectangular configuration and is made up of a plurality of angled elements 23 which define a rectangular opening. The load frame 12 is located within the support frame 11 and is positioned in a lower horizontal plane than the tubular members 20 of the support frame 11. In addition, the load frame 12 has a mounting means 24 for mounting a load platform 25 (see FIG. 4) in a horizontal plane above the support frame 11. For example, the mounting means 24 is in the form of four upstanding threaded bolts 26, each disposed at a corner of the load frame 12. Each of these bolts 26 is threadably mounted in a mounting block 27, which mounting blocks 27 are disposed in pairs on two opposite members 23 of the load frame 12. Also, each of the threaded bolts 26 includes a lock nut 28 for locking the bolt 26 in position relative to the mounting block 27 as well as a second locking nut 29 for locking against the load platform 25.

Referring to FIGS. 1 and 5, a plurality of load flexures 30 connect the load frame 12 to each of the members 13, 14, in order to transfer the mass of a load from the load frame 12 to the members 13, 14. As shown in FIGS. 1 and 6, the members 13, 14 are disposed at opposite sides of the support frame 11 with a pair of flexures 30 connecting each member 13, 14 to an element 23 of the load frame 12. These flexures 30, are in the form of spring plates 31 which are bolted by pairs of bolts 32 and cover plates 33 to each of the respective elements 23 of the load frame 12 and the members 13, 14. Likewise, each member 13, 14 is connected by a pair of support flexures 34 to the support frame 11. These support flexures 34 are substantially identical to the flexures 30 used for connecting the members 13, 14 to the load frame 11.

The beam arms 15, 16 which are connected to the members 13, 14 are disposed to one side of the flexure scale 10. As shown in FIGS. 1 and 6, one beam arm 16 is connected to one member 14 outside the projected vertical plane of the load frame 12 and extends from the member 14 almost to the opposite side of the scale 10. The beam arm 16 is welded or otherwise secured to the member 14 so as to follow movement of the member 14. At the free end, the beam arm 16 is connected to one end of the spring 18 while the opposite end of the spring 18 is mounted on a gusset 35 welded to the support frame 11. The spring 18 serves to proportionally restrain the movement of the beam arm 16.

The other beam arm 15 is secured to and extends from the opposite member 13 to a point about midway of the longer beam arm 16 and is located within the projected vertical plane of the load frame 12. The transfer arm 17 is secured to the short beam arm 15 as well as to the longer beam arm 16 in order to transfer the force of the short beam arm 15 to the longer beam arm 16. The connection of the transfer arm 17 is such that the force of the short beam arm 15 at the end is added to the force of the longer beam arm 16 so that the total force registered at the end of the longer beam arm 16 represents the sum of the forces imparted to the two members 13, 14.

Figure 2:
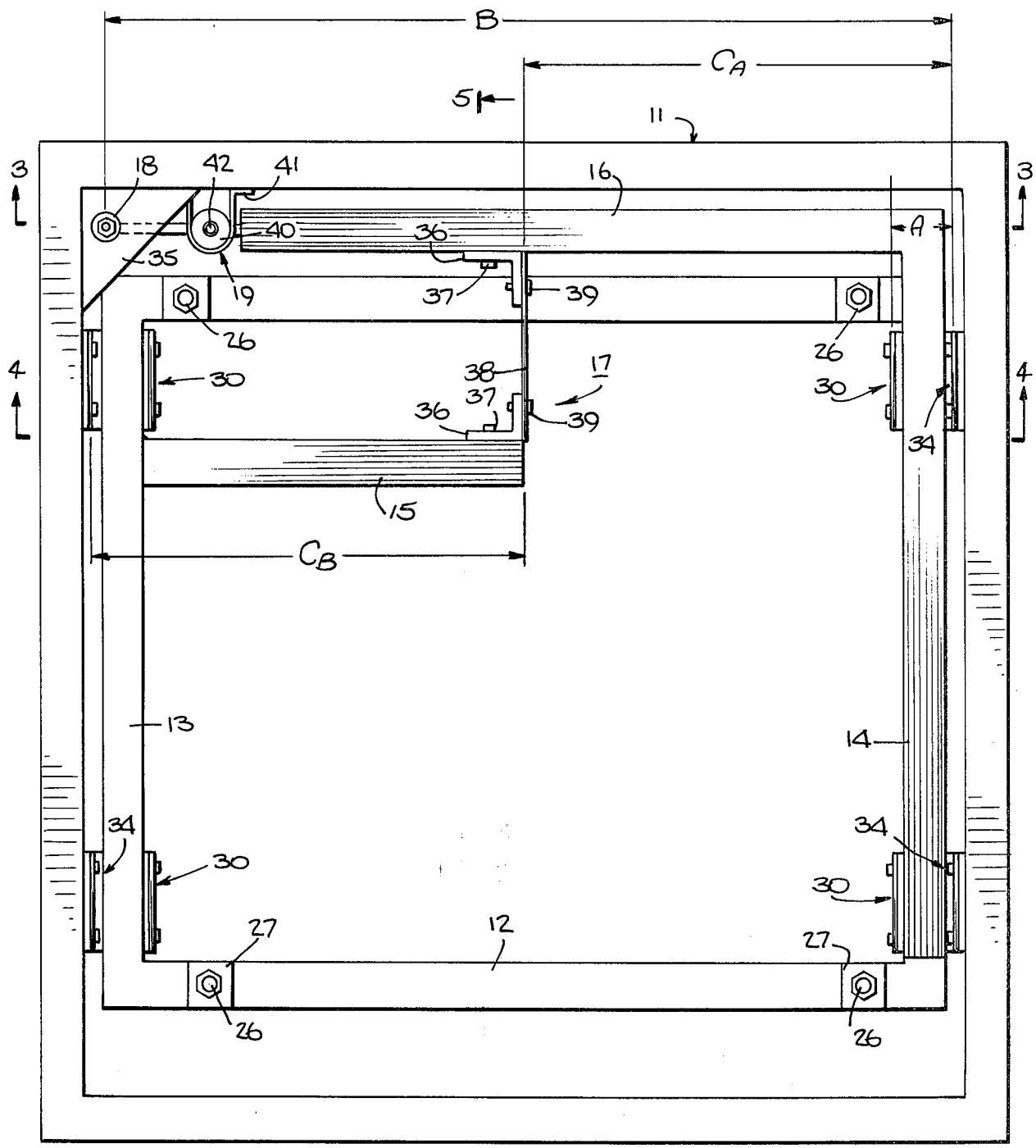
FIG. 2 illustrates a plan view of the flexure scale of FIG. 1.

As shown in FIG. 2, each of the beam arms 15, 16 carries an angle or bracket 36 which is secured thereon by one or more bolts 37. The transfer arm 17 is in the form of a flexure plate 38 which is secured to the angles 36 as by bolts 39 and which is allowed to twist to some degree to permit movement of the two beam arms 15, 16 in opposite directions.

Referring to FIGS. 3 and 6, the LVDT 19 includes a coil 40 which is mounted on the support frame 11 via a suitable bracket as well as a core 42 which is mounted on an extension of the longer beam arm 16. The core 42 is positioned relative to the coil 40 so as to travel therein in known manner. In addition, the LVDT 19 is electrically connected via suitable electrical lines 43 (FIG. 1) to a readout means (not shown) in order to emit signals thereto corresponding to the movement of the core 42 within the coil 40 and thus to the displacement of the beam arm 16 relative to the support frame 11. The readout means is of a digital type to receive the signal from the LVDT 19 and to display a digital value corresponding to the received signal as a measure of the weight of a load on the load frame.

Referring to FIGS. 5 and 6, a means is provided to restrain lateral horizontal motion of the load frame 12 relative to the support frame 11 perpendicular to the plane of the flexures 30, 34. As shown, this means is in the form of a pair of elongated straps 44 which are secured to suitable angled brackets 45 on the support legs 21 on the support frame 11. In addition, a pin on bolt 46 connects each of the straps 44 to the load frame 12. These straps 44, however, allow vertical motion between the load frame 12 and support frame 11.

Referring to FIG. 2, the distance A from the point at which the load frame 12 imposes a load on the member 14 for the longer beam arm 16 to the pivot point of the member 14 on the support frame 11 is proportioned to the distance B of the spring 18 from the pivot point of the member 14. The ratio of length B to length A may, for example, be approximately fifteen. In addition, the distance $C_A$ between the pivot point of the member 14 on the support frame 11 and the transfer arm 17 is the same as the distance $C_B$ between the pivot point of the member 13 on the support frame 11 and the transfer arm 17. Thus, a load applied to the beam arms 15, 16 through the load frame 12 would be reduced by fifteen at the spring 18. For an applied load of 150 pounds, the load on the spring 18 would be 10 pounds and for a spring having a spring constant of 50 pounds per inch the elongation of the spring 18 would be 0.200 inches.

The elongation of the spring 18 is such as to correlate with the maximum linear range of the LVDT 19. For example, where the LVDT has a maximum linear range of approximately ± 0.100 inches, the spring 18 has a spring constant of 50 pounds per inch. Should higher scale capacities be required, the spring stiffness would be increased. For example, a spring constant of 300 pounds per inch would give a capacity of 900 pounds. The scale capacity can be further increased by increasing the B/A ratio.

The LVDT 19 is mounted on the beam arm 16 so as to produce a signal of given value for a given load, i.e. a given displacement of the beam arm 16 at the location of the core 42 (FIG. 3). That is, for a standard load, the output of the LVDT will be a set value. Thus, so long as the LVDT is adjusted to emit a given signal for a given load, inaccuracies in the spring constant or in the positioning of the scale components which make-up the various beam arms and which might otherwise cause in inaccurate read-out, become of no consequence.

In use, with a load platform 25 in place as shown in FIG. 4 and with the readout means at a zero reading, a load is placed on the load platform 25. The weight of the load is then transferred via the four mounting bolts 26 into the load frame 12. The load frame 12 then moves downwardly in a vertical plane causing the two displacement transmitting members 13, 14 to rotate substantially about the points of connection of the support flexures 34 to the members 13, 14. This, in turn, causes the two beam arms 15, 16 to displace, with the displacement of the shorter beam arm 15 being transferred by the transfer arm 17 into the longer beam arm 16. However, due to the spring 18 being secured to the longer beam arm 16, the total displacement of the beam arm 16 is proportionally restrained. In a similar manner, the flexures 30, 34 proportionally restrain the displacement of the load frame 12 and members 13, 14. The displacement of the longer beam arm 16 causes the core 42 of the LVDT 19 to move downwardly within the coil 40 so that a representative signal of this displacement is emitted from the LVDT 19 to the readout means (not shown). The readout means then converts the signal into a digital reading which is displayed as an indication of the weight of the load. To this end, the readout means is of any suitable type which is able to translate the received signal into a true weight reading.

Referring to FIG. 7, instead of utilizing a load platform, the mounting means 24 of the flexure scale 10 may be connected directly to a chair 47 such as a lounge chair for seating of a medical patient. As shown in FIG. 7, such a lounge chair 47 is secured to the mounting bolts. Also, as shown, the readout means 48 is positioned adjacent to the chair for instantaneous readout. In use, a medical patient such as a dialysis patient may be seated in the chair 47 initially and the total weight of the patient before treatment recorded on the readout means 48. This weight may then be tared out, for example at the scale or at the read-out, so that a zero reading or other suitable standard is obtained. Thereafter, as treatment progresses, any fluctuations in the weight of the patient from the standard can be read or otherwise monitored on the readout means 48 instantaneously.

Referring to FIG. 8, a system including a plurality of flexure scales 10 as described above may be used with a single readout 48. In this case, each scale 10 is constructed to produce the same output for a standard load, for example, for a 100 kg load, each scale 10 is to produce a signal of 100 millivolts RMS. In order to achieve this, the LVDT 19 of each scale is equipped with a means such as a trim pot (FIGS. 9 and 10) to adjust the gain of the LVDT in order to emit a given signal for the standard load. In this way, the mechanical components of the scales need not be precisely positioned since small deviations of the core 42 of the LVDT for an electrical null point can be compensated by the trim pot.

Figure 9:
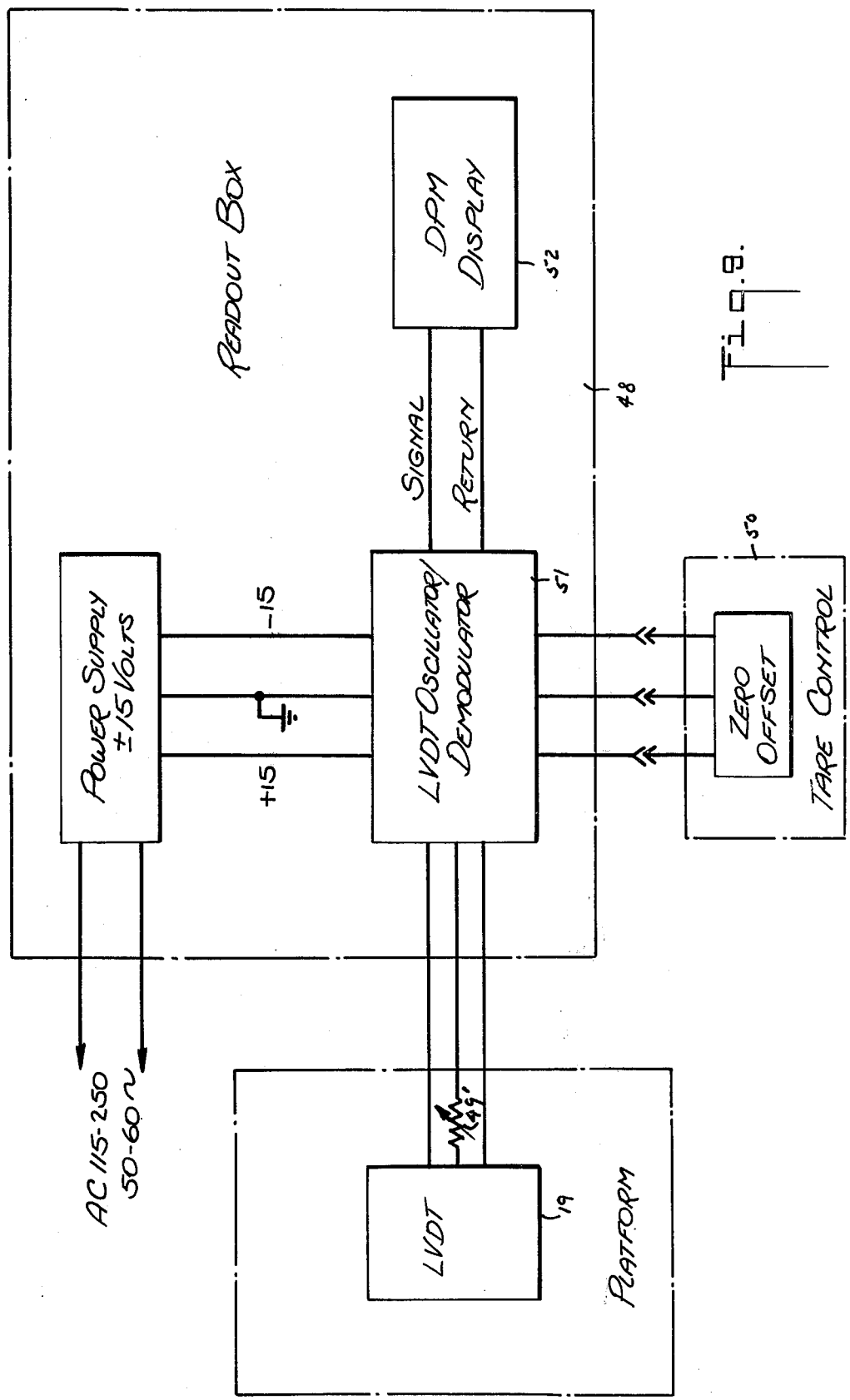
FIG. 9 illustrates a block diagram of a circuit for a linear variable differential transformer and read-out means according to the invention.

Referring to FIG. 9, the LVDT 19 is provided with a trim pot 49' to vary the gain of the LVDT so that a set value signal is produced for a standard load on a scale 10. The LVDT 19 also cooperates with a tare control 50 on the scale 10 which permits a tare load to be tared out. Thus, the signal emitted from the LVDT 19 can be representative of an increase or decrease in the weight of a fluctuating load on the scale. As indicated, the outputs of the LVDT 19 and tare control 50 are delivered to an oscillator/demodulator 51 in which the AC signals received are converted into DC signals for emission to a digital display 52.

Figure 10:
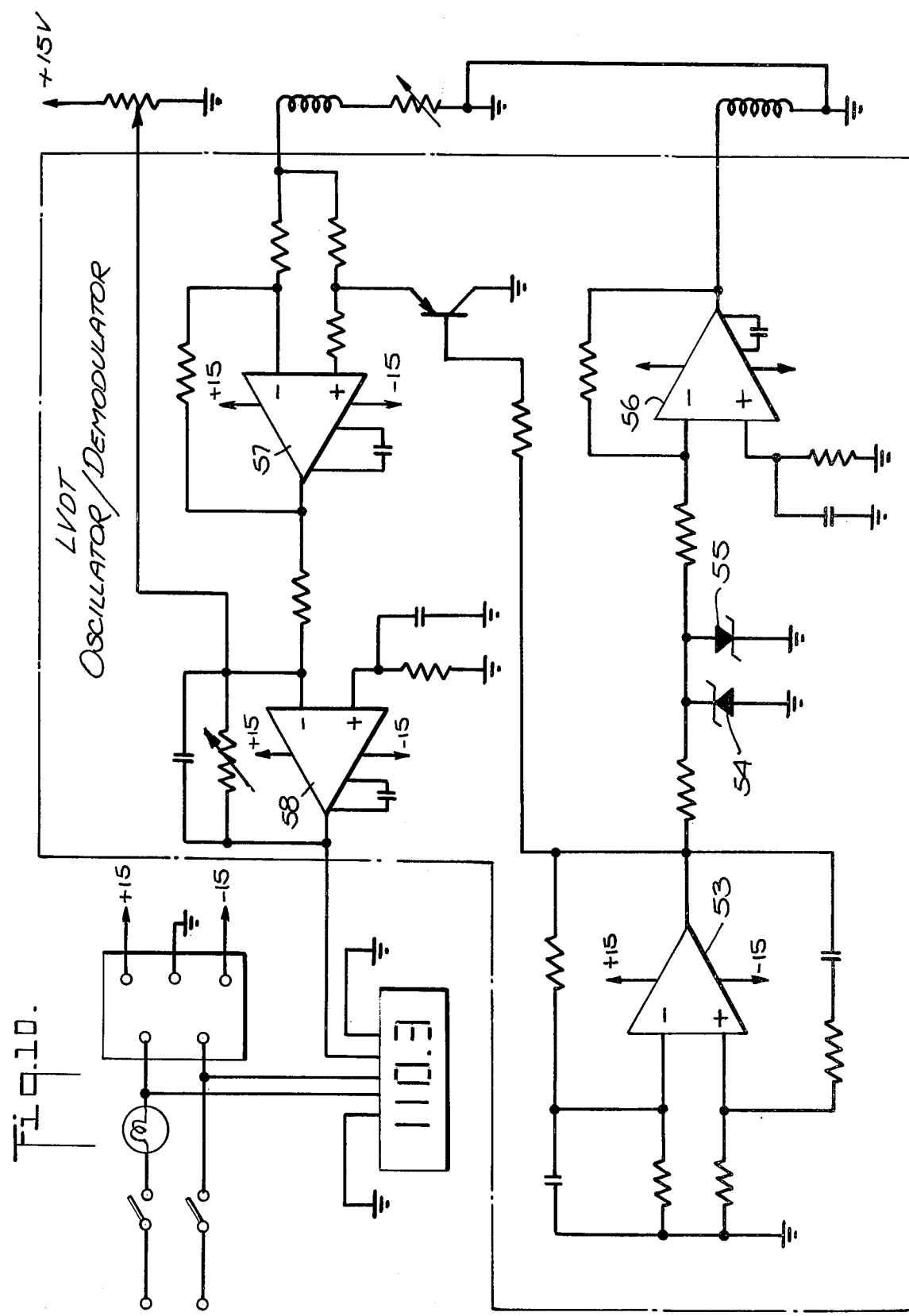
FIG. 10 illustrates a schematic circuit diagram of the linear variable differential transformer and read-out means of FIG. 9.

Referring to FIG. 10, the schematic of the electronic circuit of the LVDT 19 and read-out means 48 is believed to be self-explanatory. As indicated, the read-out means 48 includes an oscillator formed by an amplifier 53 and associated circuits, a pair of Zener diodes 54, 55 for limiting purposes, and an output amplifier 56 to drive the primary coil 57 of the LVDT 19. In addition, a demodulator which includes an amplifier 57 and associated circuits receives the output of the secondary coils of the LVDT 19 as well as the oscillator frequency in order to make the electronics phase-sensitive, fed from the oscillator. The gain adjustment signal of the LVDT is added to the output of the demodulator and fed via an amplifier 58 to the digital display 52.

Since each scale 10 of a multiplicity of scales emits exactly the same output signal for the same loads, the read-out means 48 may easily be plugged into any of the scales in a suitable manner to receive the emitted signals. In every case, the weight indicated on the read-out display 52 will be an accurate indication of the weight on the selected scale.

In view of the above, a dialysis treatment center may be equipped with a number of scales 10, e.g. eight, and one read-out means 48. These scales may be modified, for example, as shown in FIG. 7, to receive a recliner chair for seating of a patient undergoing treatment. The read-out means 48 may then be plugged sequentially into any one of the scales to initially determine the weight of each patient in a chair after the weight of the chair has been tared out via a tare control 50 (see FIG. 9) on the scale. Thereafter, with the weights of the patients also tared out, the subsequent output signals of the scales are indicative of weight changes in the patients. As a result, the weight loss of each patient can be quickly determined and records maintained of the rate of patient weight loss over a period of time.

Alternatively, as shown in FIG. 8, the read-out means 48 may be positioned at a remote location and connected via suitable lines or cables 43 and a switch 49 to the various scales 10. Should the weight of an object on a particular scale be desired, the switch 49 is activated to connect the readout means 48 to that scale. The weight or change in weight of a patient on that scale 10 can then be read on the readout means 48. The switch 49 may then be used to connect the readout means 48 to another scale to obtain weight readings therefrom.

In addition, a tare (not shown) in the form of a potentiometer may be incorporated into the read-out means to allow for taring out of various loads at the read-out means.

Because of the arrangement of the displacement transmitting members and the beam arms, the flexure scale can be made in a relatively inexpensive manner and with a minimum number of parts so as to have wide use. Further, because the support frame and load frame are made of relatively simple pieces, the overall expense for constructing such frames is at a relative minimum. Also, the overall weight of the scale can be held to a minimum.

Further, since the support frame also supports the spring and the LVDT, there is no need for any further cross-members in the frame which would add to the cost of assembly as well as to the weight of the scale.

The invention further provides a flexure scale of rather small profile. Thus, if necessary, the scale can be mounted on rollers or casters and moved from place to place. Further, the scale can be placed in a small pit, for example, for industrial applications where loads are wheeled onto a load platform secured to the load frame of the scale. Thus, minimal space is required in order to utilize the scale.

The invention further provides a scale which is made of rugged members so as to have a relatively long useful life.

Further, the invention allows the flexure scale to utilize flexures of very low spring constants so as to be very sensitive to small loads while remaining very flexible. In addition, while such flexures are sensitive to vertical loadings, they are also very rigid with respect to side loads applied in a parallel direction. This, in addition to the use of the restraining straps, allows the scale to withstand side loads.

The means for proportionally restraining the motion of the beam arms relative to the support frame may also be in the form of leaf springs or in the form of magnetic devices which restrain motion of the beam while building up a magnetic field. In this latter case, the current is proportional to the force required to keep the beam at a null (i.e. zero) position. Thus, by measuring the current, the magnitude of the load on the scale can be determined. Similarly, the sensing means can be of other suitable types.

What is claimed is:
1. A scale comprising
    a support frame;
    a load frame disposed on said support frame for receiving a load;
    a pair of displacement transmitting members disposed on opposite sides of said support frame;
    a plurality of load flexures connecting said load frame to each of said members to transfer the weight of a load thereto;
    a plurality of support flexures connecting each said member to said support frame to permit each member to pivot under an applied weight of a load on said load frame;
    a first beam arm secured to one of said members to pivot therewith and extending towards the other of said members;
    a second beam arm secured to the other of said members;
    a transfer arm secured to said second beam arm and to said first beam arm to transfer the load of said second beam arm to said first beam arm;
    means disposed between said support frame and said first beam arm to proportionately restrain movement of said first beam arm relative to said support frame; and
    a sensing means mounted on said support frame near one corner for emitting a signal corresponding to the displacement of said first beam arm relative to said support frame as a measure of the magnitude of a load on said load frame.

2. A scale as set forth in claim 1 which further comprises a readout means for receiving the signal from said sensing means and for displaying a value corresponding to said signal as a measure of weight of the load on said load frame.

3. A scale as set forth in claim 1 wherein said load frame includes means for securing a load platform thereon.

4. A scale as set forth in claim 1 further comprising means for restraining lateral horizontal motion of said load frame relative to said support frame.

5. A scale as set forth in claim 1 wherein said first means is a spring.

6. A scale as set forth in claim 1 wherein said load frame has a plurality of side portions defining a rectangular opening and wherein said members are vertically aligned above two opposite portions of said load frame.

7. A scale as set forth in claim 6 wherein said first beam arm is longer than said second beam arm and is located to one side of said load frame and outside the projected vertical plane of said load frame, said second beam arm being located within the projected vertical plane of said load frame.

8. A scale as set forth in claim 1 wherein said sensing means is a linear variable differential transformer.

9. A scale as set forth in claim 8 wherein said transformer includes a coil mounted on said support frame and a core mounted on said first beam within said coil.

10. In combination with a chair for seating a medical patient;
   a scale for displaying changes in weight of the patient in said chair, said scale comprising
   a support frame;
   a load frame disposed on said support frame for receiving the chair;
   a pair of displacement transmitting members disposed on opposite sides of said support frame;
   a plurality of load flexures connecting said load frame to each of said members to transfer the weight of a load thereto;
   a plurality of support flexures connecting each said member to said support frame to permit each member to pivot under an applied weight of a load on said load frame;
   a first beam arm secured to one of said members to pivot therewith;
   a second beam arm secured to the other of said members;
   a transfer arm secured to said second beam arm and to said first beam arm to transfer the motion of said second beam arm to said first beam arm;
   means secured to said support frame and to said first beam arm to proportionately restrain movement of said beam arm relative to said support frame;
   a linear variable differential transformer mounted on said support frame for emitting a signal corresponding to the displacement of said first beam arm at said free end relative to said support frame; and
   a readout means connected to said transformer to display changes in weight of the patient in said chair.

11. In combination, a plurality of scales, each scale including a support frame; a load frame mounted on said support frame for receiving a load and for moving vertically relative to said support frame upon receiving a load; a beam arm connected to said load frame to pivot about a horizontal axis in response to movement of said load frame; means mounted on said support frame and secured to said beam arm to proportionally restrain movement of said beam arm relative to said support frame; and a linear variable differential transformer mounted on said support frame for emitting a signal corresponding to the displacement of said beam arm relative to said support frame; and
   a single digital readout means for selectively receiving a signal from said transformer of each scale and for displaying a digital valve corresponding to the received signal as a measure of weight of a load on a respective scale.

12. The combination as set forth in claim 11 which further comprises cable means connecting each scale to said readout means and a switch means for selectively connecting one of said cables to said readout means.

13. The combination as set forth in claim 11 wherein each scale further includes a second beam arm secured to said load frame and extending towards said one beam arm, and a transfer arm secured to said second beam arm and to said first beam arm to transfer the motion of said second beam arm to said first beam arm.

14. The combination as set forth in claim 11 wherein said transformer includes means for adjusting the gain thereof.

15. The combination as set forth in claim 11 wherein said transformer includes a primary coil, a secondary coil and a trim pot on said secondary coil for adjusting the gain of said transformer.

16. The combination as set forth in claim 11 which further includes a tare control on each scale, said tare control being selectively connected to said read-out with a respective transformer to tare out predetermined loads.

17. A scale comprising
   a support frame having a plurality of tubular members defining a rectangular opening;
   a load frame having a plurality of tubular members defining a rectangular opening;
   a pair of displacement transmitting members disposed on opposite sides of said support frame;
   a plurality of load flexures connecting said load frame to each of said members to transfer the force of a load thereto;
   a plurality of support flexures connecting each of said members to said support frame to permit each member to pivot under an applied weight of a load on said load frame;
   a first beam arm secured to one of said members to pivot therewith, said arm being located outside the plane of said opening in said load frame;
   a second beam arm secured to the other of said members and extending towards said one beam arm;
   a transfer arm secured to said second beam arm and to said first beam arm to transfer the load of said second beam arm to said first beam arm;
   a spring secured at one end to said support frame and at an opposite end to said beam arm to proportionately restrain movement of said beam arm; and
   a linear variable differential transformer mounted between said support frame and said first beam arm for emitting a signal corresponding to the displacement of said first beam arm relative to said support frame as a measure of the weight of a load on said load frame.

18. A scale as set forth in claim 17 which further comprises a digital readout means for receiving the signal from said transformer and for displaying a digital value corresponding to said signal as a measure of weight of the load on said load frame.

19. A scale as set forth in claim 17 wherein each of said load flexures and support flexures each have a spring constant of a magnitude of 1 pound per inch and said spring has a spring constant of a magnitude of 50 pounds per inch.

20. A scale as set forth in claim 19 further comprising means for restraining lateral horizontal motion of said load frame relative to said support frame and perpendicular to the plane of said flexures.

* * * * *